Patented May 14, 1935

2,001,010

UNITED STATES PATENT OFFICE 2,001,010

ORTHO-HYDROXYAZO DYES

Walther Benade, Dessau in Anhalt, Germany, assignor to General Aniline Works, Inc., New York, N. Y., a corporation of Delaware No Drawing. Application January 28, 1933, Serial No. 654,109. In Germany April 18, 1932

12 Claims. (Cl. 260—86)

My present invention relates to a process for manufacturing valuable new ortho-hydroxyazo dyes and to the products obtainable according to this process.

I have found that valuable dyes suitable for dyeing wool with the aid of a chromium mordant by the single-bath process are obtainable by diazotizing a 2-amino-1-hydroxybenzene sulfonic acid, or a nuclear substitution product thereof, and coupling the diazo compound with a benzo-2,4-dihydroxyquinoline.

The dyes thus obtained are distinguished by their solubility in water and their good affinity for wool. They yield, when dyed on wool, according to the single-bath process in the presence of a chromium mordant red to violet tints having a good fastness to fulling and washing and an excellent fastness to light. 7,8-benzo-2,4-dihydroxyquinoline, suitable as a coupling component, is described in "Berichte der Deutschen Chemischen Gesellschaft", vol. 60 page 841. 5,6-benzo-2,4-dihydroxyquinoline can be made in a manner similar to that prescribed in "Berichte der Deutschen Chemischen Gesellschaft", namely, by heating 2-naphthylamine with malonic acid ester. The production of the 6,7-isomeride is by treatment of acetyl-2,3-aminonaphthoic acid as described in German specification No. 117 167; homologues and substitution products of these bodies can be made from the appropriate parent materials in a manner analogous to that described in the aforesaid publications.

The following examples illustrate the invention, the parts being by weight:—

*Example 1.*—22.4 parts of 4-chloro-2-amino-1-hydroxybenzene-6-sulfonic acid are suspended in about 300 parts of water and diazotized at 10° C. by addition of 5 parts of hydrochloric acid of 12° Bé and 6.9 parts of sodium nitrite. The diazo-compound thus obtained is allowed to run into a cold solution of 23 parts of 2,4-dihydroxy-α-naphtho-quinoline and 20 parts of sodium carbonate dissolved in about 500 parts of water. When the reaction has finished, the mass is warmed to 80° C. and the dye is separated by addition of common salt. When dry, it is a dark powder which is easily soluble in water and dyes wool red violet tints without the necessity either of preliminary mordanting or after-treatment when carrying out the chromium-mordanting and dyeing processes according to the single-bath process. The shades thus obtained have a good fastness to milling and washing and an excellent fastness to light.

A similar product is obtainable when starting from 4-chloro-2-amino-1-hydroxybenzene-5-sulfonic acid.

*Example 2.*—The diazo compound prepared from 23.4 parts of 4-nitro-2-amino-1-hydroxybenzene-6-sulfonic acid, 6.9 parts of sodium nitrite and 5 parts of hydrochloric acid (12° Bé) in about 500 parts of water, is added to a solution of 23 parts of 2,4-dihydroxy-α-naphthoquinoline and 20 parts of sodium carbonate in 500 parts of water which is cooled by ice. The dye formed is worked up as usual. It forms in the dry state a dark powder which is easily soluble in water and dyes wool according to the chromium mordanting single-bath process garnet shades of good fastness to milling and washing.

*Example 3.*—22.4 parts of 4-chloro-2-amino-1-hydroxybenzene-6-sulfonic acid are suspended in about 300 parts of water and after addition of 5 parts of hydrochloric acid of 12° Bé are diazotized at 10° C. by addition of 6.9 parts of sodium nitrite. The finished diazo compound is run into a cold solution of 23 parts of 5,6-benzo-2,4-dihydroxyquinoline and 6 parts of sodium hydroxide in about 500 parts of water. When coupling is complete, the dye is worked up in known manner. When dry, it is a dark powder; it dyes wool by the single-bath chrome process violet tints of very good fastness to washing and fulling.

*Example 4.*—A diazo compound made from 23.4 parts of 4-nitro-2-amino-1-hydroxybenzene-6-sulfonic acid, 6.9 parts of sodium nitrite and 5 parts of hydrochloric acid of 12° Bé and contained in about 500 parts of water, is added to a solution, cooled with ice, of 23 parts of 6,7-benzo-2,4-dihydroxyquinoline and 20 parts of calcined sodium carbonate in 500 parts of water. The dye thus produced is salted out; when dry, it is a dark powder which dissolves well and produces on wool by the single-bath chrome process garnet colored tints of good fastness to washing and fulling.

It is obvious that my invention is not limited to the foregoing examples or to the specific details given therein.

Thus, I may use other 2-amino-1-hydroxy-benzene sulfonic acids, whereby other dyes, having similar qualities, are obtainable. I mention, for instance, the unsubstituted 2-amino-1-hydroxybenzene sulfonic acids, I prefer, however, those azo components of the class mentioned above, which contain the nitro group or halogen as a substituent. 4-nitro-2-amino-1-hydroxybenzene sulfonic acid is one of these components being applicable as starting material.

What I claim is:—

1. The ortho-hydroxyazo dyes corresponding to the general formula

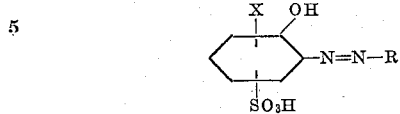

wherein R means

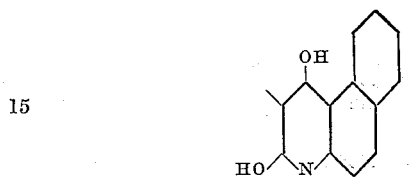

or

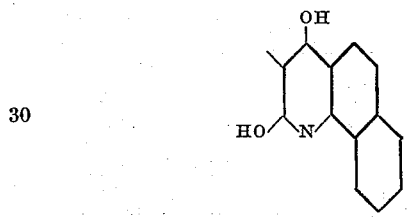

and X means hydrogen, halogen or NO₂, said dyes dyeing wool in the presence of a chromium mordant according to the single-bath process red to violet tints of good fastness to fulling and washing and excellent fastness to light.

2. The ortho-hydroxyazo dyes corresponding to the general formula

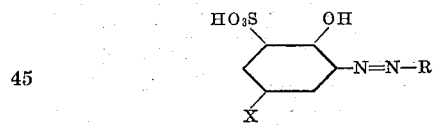

wherein R means

or

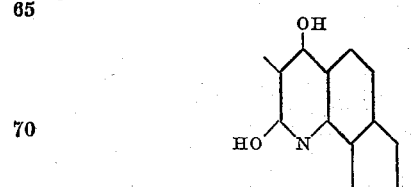

and X means hydrogen, halogen or NO₂, said dyes dyeing wool in the presence of a chromium mordant according to the single-bath process red to violet tints of good fastness to fulling and washing and excellent fastness to light.

3. The ortho-hydroxyazo dyes corresponding to the general formula

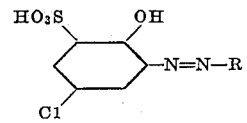

wherein R means

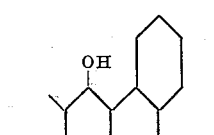

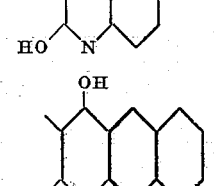

or

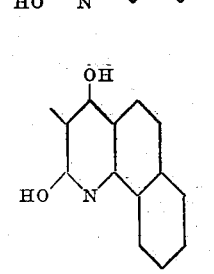

said dyes dyeing wool in the presence of a chromium mordant according to the single-bath process violet tints of good fastness to fulling and washing and excellent fastness to light.

4. The ortho-hydroxyazo dye corresponding to the general formula

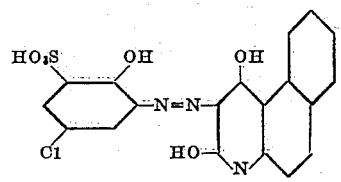

said dye dyeing wool in the presence of a chromium mordant according to the single-bath process violet tints of good fastness to fulling and washing and excellent fastness to light.

5. The ortho-hydroxyazo dye corresponding to the general formula

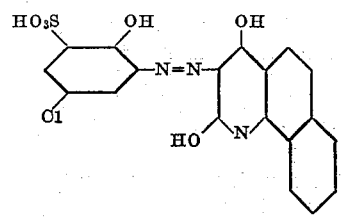

said dye dyeing wool in the presence of a chromium mordant according to the single-bath process red-violet tints of good fastness to fulling and washing and excellent fastness to light.

6. The ortho-hydroxyazo dye corresponding to the general formula

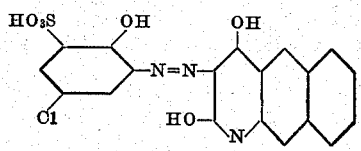

said dye dyeing wool in the presence of a chromium mordant according to the single-bath process violet tints of good fastness to fulling and washing and excellent fastness to light.

7. The process which comprises diazotizing a 1-hydroxy-2-aminobenzene mono-sulfonic acid and coupling the diazo compound with a benzo-2,4-dihydroxyquinoline.

8. The process which comprises diazotizing a 1-hydroxy-2-aminochlorobenzene mono-sulfonic acid and coupling the diazo compound with a benzo-2,4-dihydroxyquinoline.

9. The process which comprises diazotizing a 1-hydroxy-2-amino-4-chlorobenzene-6-sulfonic acid and coupling the diazo compound with a benzo-2,4-dihydroxyquinoline.

10. The process which comprises diazotizing 1-hydroxy-2-amino-4-chlorobenzene-6-sulfonic acid and coupling the diazo compound with 6,7-benzo-2,4-dihydroxyquinoline.

11. The process which comprises diazotizing 1-hydroxy-2-amino-4-chlorobenzene-6-sulfonic acid and coupling the diazo compound with 7,8-benzo-2,4-dihydroxyquinoline.

12. The process which comprises diazotizing 1-hydroxy-2-amino-4-chlorobenzene-6-sulfonic acid and coupling the diazo compound with 5,6-benzo-2,4-dihydroxyquinoline.

WALTHER BENADE.